United States Patent [19]

Ohta et al.

[11] Patent Number: 5,043,419

[45] Date of Patent: Aug. 27, 1991

[54] PROCESS FOR PREPARING A POLYIMIDE AND A COMPOSITE MATERIAL CONTAINING THE SAME

[75] Inventors: Masahiro Ohta, Yokohama; Saburo Kawashima, Yokosuka; Shoji Tamai, Yokohama; Hideaki Oikawa, Yokohama; Akihiro Yamaguchi, Kamakura; Tomohito Koba, Yokohama; Toshiyuki Nakakura, Yokohama; Hideo Sakai, Ebina; Misao Masuda, Fujisawa; Satoru Kishi, Yokosuka; Chiaki Maruko, Kamakura, all of Japan

[73] Assignee: Mitsui Toatsu Chemicals, Inc., Tokyo, Japan

[21] Appl. No.: 261,520

[22] Filed: Oct. 24, 1988

[30] Foreign Application Priority Data

Oct. 23, 1987 [JP] Japan .................. 62-266191
Oct. 27, 1987 [JP] Japan .................. 62-269370
Nov. 16, 1987 [JP] Japan .................. 62-287553
Nov. 25, 1987 [JP] Japan .................. 62-295316

[51] Int. Cl.$^5$ .................. C08G 8/02; C08G 63/00; C08G 69/26; C08G 75/00
[52] U.S. Cl. .................. 528/353; 528/125; 528/126; 528/172; 528/176; 528/187
[58] Field of Search .............. 528/353, 176, 187, 125, 528/126, 172

[56] References Cited

U.S. PATENT DOCUMENTS

| | | | |
|---|---|---|---|
| 3,708,459 | 1/1973 | Lubowitz | 528/353 |
| 3,803,085 | 4/1974 | Takehoshi et al. | 528/26 |
| 4,073,773 | 2/1978 | Banucci et al. | 528/208 |
| 4,281,100 | 7/1981 | Takekoshi | 528/188 |
| 4,681,928 | 7/1987 | Berger et al. | 528/353 |
| 4,696,994 | 9/1987 | Nakajima et al. | 528/176 |

FOREIGN PATENT DOCUMENTS

| | | |
|---|---|---|
| 61-143478 | 7/1986 | Japan . |
| 61-229534 | 10/1986 | Japan . |
| 61-229535 | 10/1986 | Japan . |
| 61-229536 | 10/1986 | Japan . |
| 62-68817 | 3/1987 | Japan . |
| 62-86021 | 4/1987 | Japan . |
| 62-235381 | 10/1987 | Japan . |
| 62-248635 | 10/1987 | Japan . |
| 63-128025 | 5/1988 | Japan . |

*Primary Examiner*—John Kight, III
*Assistant Examiner*—P. Hampton-Hightower
*Attorney, Agent, or Firm*—Burns, Doane, Swecker & Mathis

[57] ABSTRACT

This invention relates to a method for preparing a polyimide having good heat-stability and excellent flowability in a molten state.

The polyimide is prepared by reacting aromatic diamines such as 4,4'-bis(3-aminophenoxy)biphenyl, bis[4-(3-aminophenoxy)phenyl] ketone and bis [4-(3-aminophenoxy)phenyl] sulfone; tetracarboxylic dianhydrides such as pyromellitic dianhydride, 3,3', 4,4'-benzophenonetetracarboxylic dianhydride and bis(3,4-dicarboxyphenyl) ether dianhydride; and dicarboxylic anhydrides such as glutaric anhydride, 1,2-hexanedicarboxylic anhydride, phthalic anhydride and 3,4-benzophenonedicarboxylic anhydride. The molar ratio of aromatic diamine: tetracarboxylic dianhydride: dicarboxylic anhydride is 1:(0.9 to 1.0):(0.001 to 1.0).

The invention also relates to polyimide composite materials which are excellent in mechanical strengths and processability. The materials contain the polyimide and fibrous reinforcing materials such as yarn, roving, tow, fabrics, mats and felts of glass fiber, carbon fibers or aromatic polyamide fibers.

37 Claims, 6 Drawing Sheets

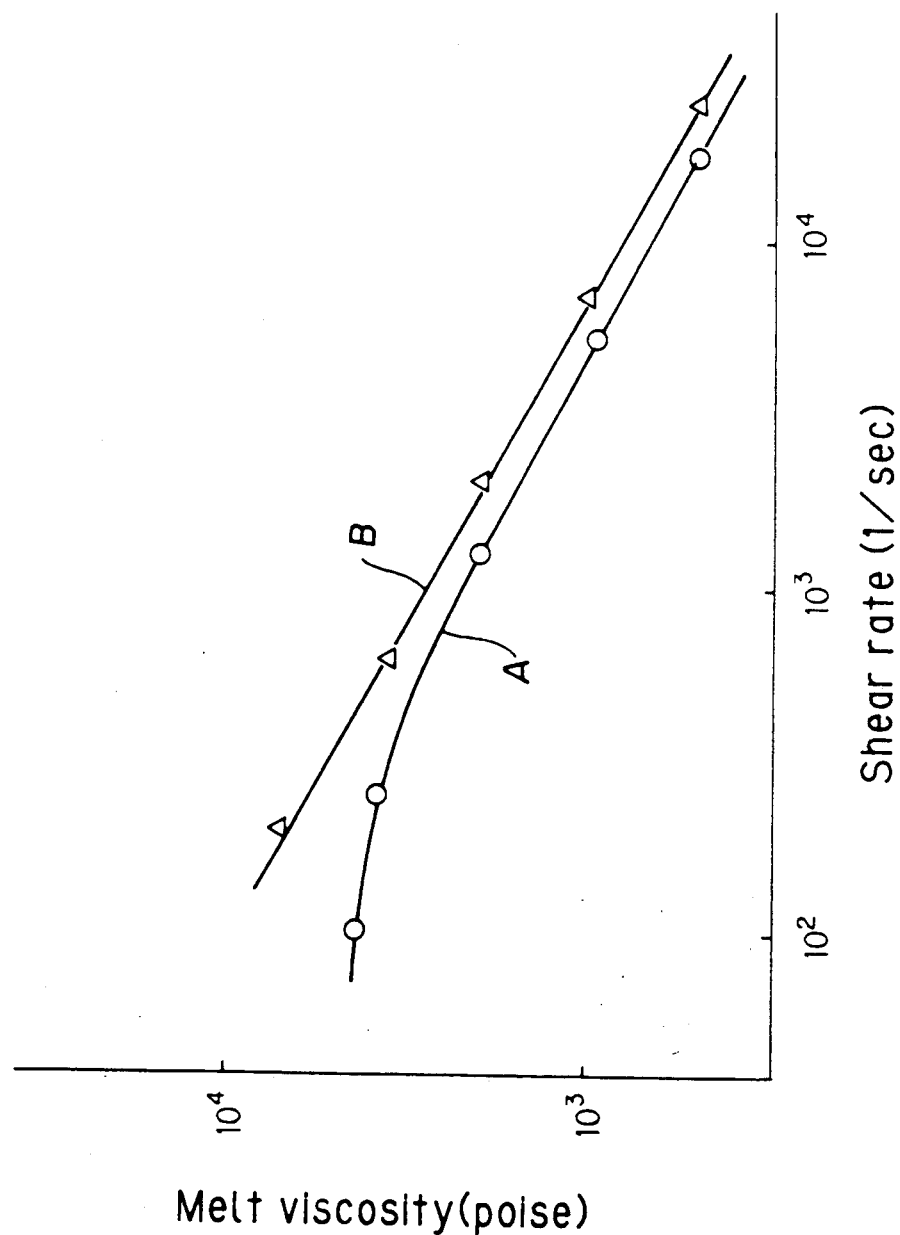

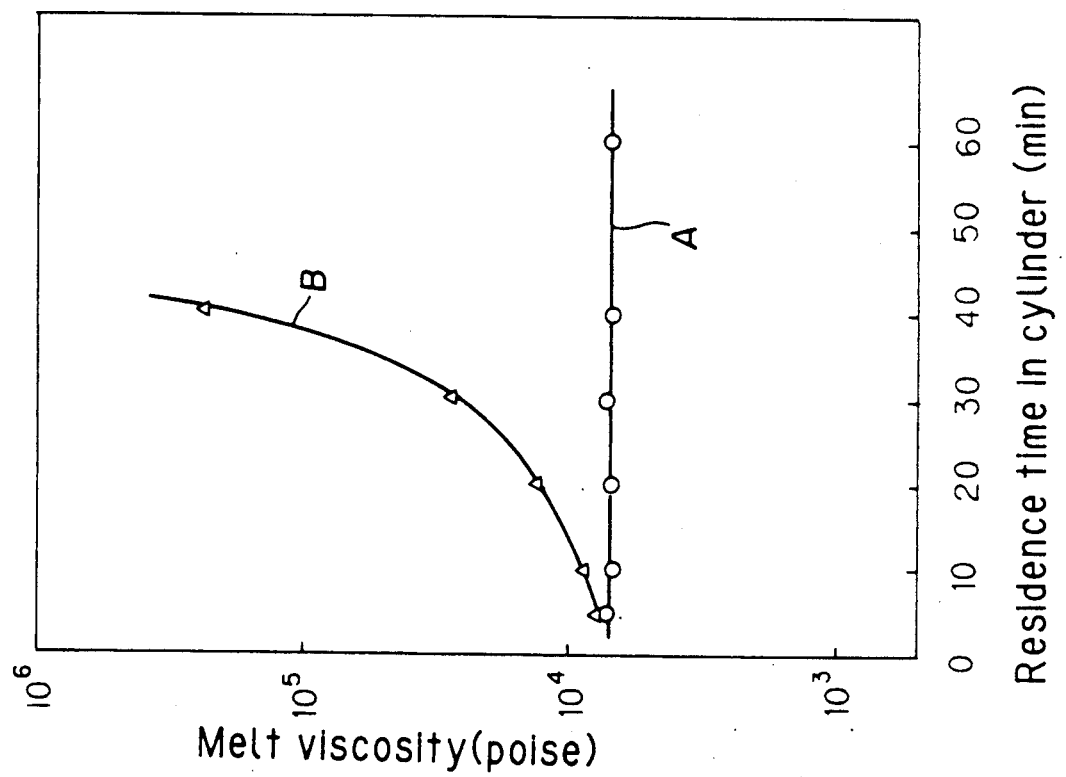

PROCESS FOR PREPARING A POLYIMIDE AND A COMPOSITE MATERIAL CONTAINING THE SAME

BACKGROUND OF THE INVENTION

The present invention relates to a process for preparing a polyimide for fusion molding that has excellent thermal stability and processability in a molten state.

The present invention also relates to a polyimide composite material that has excellent high-temperature stability, chemical resistance and mechanical strength as well as outstanding processability.

A polyimide obtained by reacting tetracarboxylic dianhydride and aromatic diamine has excellent mechanical strength, dimensional stability, high temperature stability flame resistance and electrical insulation properties. Such a polyimide has been used in electrical and electronic appliances, space and aeronautical instruments and transport machinery. It is expected that it will also be used in applications where high-temperature resistance is required.

A variety of polyimides exhibiting excellent properties have been developed. Some polyimides, however, have no distinct glass transition temperature, although they are excellent in high-temperature stability. As a result, when employed as molding materials, specific methods such as sinter molding must be used for processing. Other polyimides which are excellent in processability have low glass transition temperatures and are soluble in haloganated hydrocarbons, which renders these polyimides unsatisfactory for use in applications which require a high-temperature stability and solvent resistance. Thus, these polyimides have numerous advantages and disadvantages.

The present inventors have previously discovered a polyimide that is excellent in mechanical strength, thermal characteristics, electrical properties and solvent resistance and exhibits high-temperature stability. The polyimide consists primarily of recurring units of the formula:

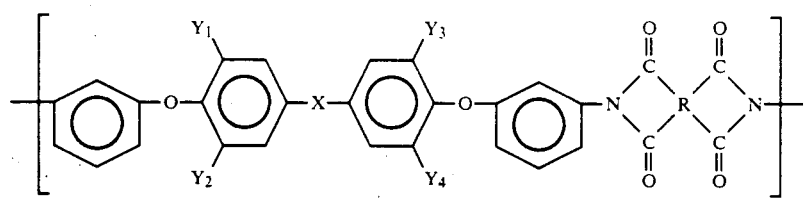

wherein X represents a direct bond or a radical selected from the group consisting of a $C_1$–$C_{10}$ divalent hydrocarbon radical, a hexafluorinated isopropylidene radical, a carbonyl radical, a thio radical and a sulfonyl radical; $Y_1$, $Y_2$, $Y_3$ and $Y_4$ represent a radical selected from the group consisting of a hydrogen atom, a lower alkyl radical, a lower alkoxy radical, a chlorine atom and a bromine atom; and R represents a tetravalent radical selected from the group consisting of an aliphatic radical having 2 or more carbon atoms, a cyclic aliphatic radical, a monocyclic aromatic radical, a fused polycyclic aromatic radical, and a polycyclic aromatic radical wherein the aromatic rings are linked together directly or via a bridged member. The polyimides have been disclosed in the following Japanese Laid-Open Patents.

Ohta et al.; TOKKAISHO 61-143478 (1986)

Tamai et al.; TOKKAISHO 62-68817 (1987) which corresponds to copending United States patent application Ser. No. 44,028, filed on June 30, 1986 now U.S. Pat. No. 4,897,349

Ohta et al.; TOKKAISHO 62-86021 (1987) which corresponds to copending United States patent application Ser. No. 44,028, filed on June 30, 1986 now U.S. Pat. No. 4,897,349

Ohta et al.; TOKKAISHO 62-235381 (1987) and

Oikawa et al.; TOKKAISHO 63-128025 (1988) which corresponds to copending United States patent application Ser. No. 119,042, filed on Nov. 10, 1987 now U.S. Pat. No. 4,908,409

The polyimide is a novel high-temperature stable resin having many good properties.

The polyimide exhibits excellent flowability and good processability. The fused resin, however, gradually exhibits decreased flowability which has an adverse effect on the processability when the polyimide is kept at high temperatures for a long period of time, for example, long residence at high temperatures in a cylinder in the injection molding.

Therefore, it is desirable to develop a polyimide which exhibits good flowability at lower temperatures and stable flowability for a long period of time during processing.

Previously produced molded products prepared by using composite materials composed of polyimides and fibrous reinforcing materials exhibit excellent mechanical strengths, particularly strength retention at high temperatures and are also outstanding in solvent resistance and dimensional stability. Such molded products are desirable for use as structural members for space crafts and the like.

Polyimides, generally have a high melt viscosity. Therefore composite materials containing these polyimides as matrices have required severe processing conditions as compared to those containing matrices of engineering plastics such as polycarbonate and polyethylene terephathalate, thereby causing various problems.

Special polyimides having low melt viscosity and excellent workability have also been known in the art. Such polyimides, however, have a low heat distortion temperature and are soluble in solvents such as halogenated hydrocarbons. Consequently, the composites containing such a resin as a matrix have caused problems in high-temperature stability and chemical resistance.

In order to overcome these problems, a composite material containing a polyimide having above stated good properties and fibrous reinforcing materials has been developed [Koba et al.; Japanese Laid-Open Patent TOKKAISHO 62-248635 (1987)]. The polyimide, however, gradually decreases its melt flowability when maintained at high temperatures for a long period. This phenomenon often inhibits continuous operation. Accordingly, the development of polyimide composite materials which are capable of operating for a long period of time and also provide excellent properties is strongly desired.

SUMMARY OF THE INVENTION

An object of this invention is to provide a method for preparing an excellent polyimide which has, in addition to its substantially outstanding properties, good thermal stability in a molten state and does not deteriorate processability even after residence in high temperatures for a long period of time.

Another object of this invention is to provide a polyimide base composite material capable of being stably processed for a long period of time without giving adverse effect on the essential properties of the polyimide such as high-temperature stability, chemical resistance and dimensional stability.

BRIEF DESCRIPTION OF THE DRAWINGS

FIG. 1 and FIG. 5 illustrate the relationship between share rate and melt viscosity of the polyimide prepared by the process of this invention.

FIG. 3 and FIG. 4 illustrate the relationship between the melt viscosity and residence time of the polyimide in the cylinder of flow tester in this invention.

DETAILED DESCRIPTION OF THE INVENTION

Figure 3:
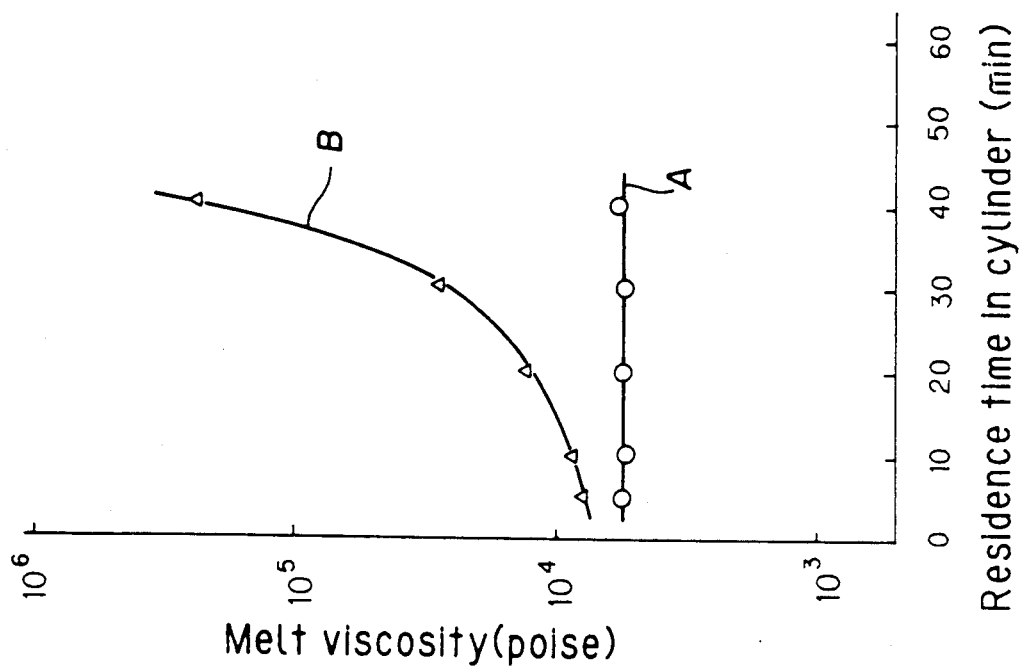

The present invention relates to a process for preparing a thermally stable polyimide consisting primarily of recurring units of the formula:

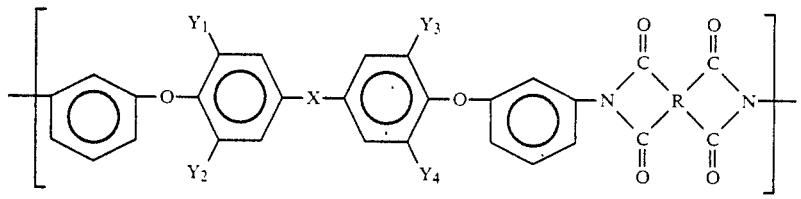

wherein X represents a direct bond or a radical selected from the group consisting of a $C_1$–$C_{10}$ divalent hydrocarbon radical, a hexafluorinated isopropylidene radical, a carbonyl radical, a thio radical and a sulfonyl radical; $Y_1$, $Y_2$, $Y_3$ and $Y_4$ may be the same or different and represent a radical selected from the group consisting of a hydrogen atom, a lower alkyl radical, a lower alkoxy radical, a chlorine atom and bromine atom; and R represents a tetravalent radical selected from the group consisting of an aliphatic radical having 2 or more carbon atoms, a cyclic aliphatic radical, a monocyclic aromatic radical, a fused polycyclic aromatic radical, and a polycyclic aromatic radical wherein the aromatic rings are linked together directly or via a bridged member.

The process of the present invention comprises reacting (a) an aromatic diamine represented by the formula (I)

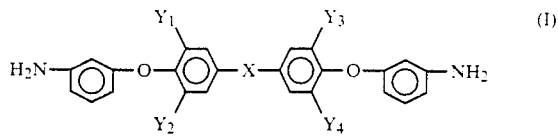

wherein X, $Y_1$, $Y_2$, $Y_3$ and $Y_4$ have the same meanings as set forth above.

(b) a tetracarboxylic dianhydride represented by the formula (II)

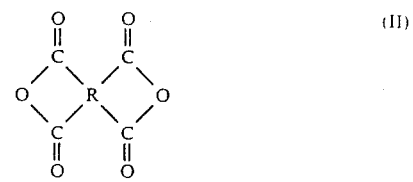

wherein R is as above defined, (c) a dicarboxylic anhydride represented by the formula (III)

wherein Z represents a divalent radical selected from the group consisting of an aliphatic radical, a cyclic aliphatic radical, a monocyclic aromatic radical, a fused polycyclic aromatic radical, and a polycyclic aromatic radical wherein the aromatic radicals are linked to one another directly or via bridged member, form a polyamic acid, and dehydrating or imidizing the polyamic acid to form a polyimide. Preferably, the molar ratio of the tetracarboxylic dianhydride is from about 0.9 to about 1.0 mole per mole of aromatic diamine and, preferably the molar ratio of the dicarboxylic anhydride is from about 0.001 to about 1.0 mole per mole of diamine.

Exemplary suitable aromatic diamines for use in the process of this invention includes, bis[4-(3-aminophenoxy)phenyl]methane, 1,1-bis[4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)-3-methylphenyl]-propane, 2,2-bis[4-(3-aminophenoxy)-3-methylphenyl]propane, 2-[4-(3-aminophenoxy)phenyl]-2-[4-(3-aminophenoxy)-3,5dimethylphenyl]propane, 2,2-bis[4-(3-aminophenoxy)-3,5-dimethylphenyl]propane, 2,2-bis[4-(3-aminophenoxy)phenyl]butane, 2,2-bis[4-(3-aminophenoxy)phenyl]-1,1,1,3,3,3-hexafluoropropane,
4,4'-bis(3-aminophenoxy)biphenyl,
4,4'-bis(3-aminophenoxy)-3-methylbiphenyl,
4,4'-bis(3-aminophenoxy)-3,3'-dimethylbiphenyl,
4,4'-bis(3-aminophenoxy)-3,5-dimethylbiphenyl,
4,4'-bis(3-aminophenoxy)-3,3',5,5'-tetramethylbiphenyl,
4,4'-bis(3-aminophenoxy)-3,3'-dichlorobiphenyl,
4,4'-bis(3-aminophenoxy)-3,5-dichlorobiphenyl,
4,4'-bis(3-aminophenoxy)-3,3',5,5'-tetrachlorobiphenyl,
4,4'-bis(3-aminophenoxy)-3,3'-dibromobiphenyl,
4,4'-bis(3-aminophenoxy)-3,5-dibromobiphenyl,
4,4-bis(3-aminophenoxy)-3,4',5,5'tetrabromobiphenyl,
bis[4-(3-aminophenoxy)phenyl]ketone, bis[4-(3-aminophenoxy)phenyl]sulfide, bis[4-(3-aminophenoxy)-3-methoxyphenyl]sulfide,
[4-(3-aminophenoxy)phenyl][4-(3-aminophenoxy)-3,5-dimethyoxyphenyl]sulfide, bis[4-(3-aminophenoxy)-3,5-dimethoxyphenyl]sulfide, and bis[4-3-aminophenoxy)phenyl] sulfone.

Preferably aromatic diamines selected from the group consisting of
4,4'-bis(3-aminophenoxy)biphenyl,
2,2-bis[4-(3-aminophenoxy)phenyl]propane, bis[4-(3-aminophenoxy)phenyl]ketone, bis[4-(3-aminophenoxy)phenyl] sulfide and bis[4-(3-aminophenoxy)phenyl]sulfone are employed. The diamine compound may be used singly or in combination.

Other diamines may be used in the process of the invention so long as adverse effect on the properties of the polyimide produced by the process of this invention.

Exemplary suitable tetracarboxylic dianhydrides for use in the process of this invention include ethylenetetracarboxylic dianhydride, butanetetracarboxylic dianhydride, cyclopentanetetracarboxylic dianhydride, pyromellitic dianhydride,
1,1-bis(2,3-dicarboxyphenyl)ethane dianhydride,
bis(2,3-dicarboxyphenyl)methane dianhydride,
bis(3,4-dicarboxypenyl)methane dianhydride,
2,2-bis(3,4-dicarboxyphenyl)propane dianhydride,
2,2-bis(2,3-dicarboxyphenyl)propane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride, 3,3',4,4'-benzophenonetetracarboxylic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
bis(3,4-dicarboxyphenyl) ether dianhydride, bis(2,3-dicarboxyphenyl) ether dianhydride, bis(3,4-dicarboxyphenyl) sulfone dianhydride,
4,4'-(p-phenylenedioxy)diphthalic dianhydride,
4,4'-(m-phenylenedioxy)diphthalic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.

Preferred tetracarboxylic dianhydrides for use in the process of this invention include pyromellitic dianhydride, 3,3'4,4'-benzophenonetetracarboxylic dianhydride, 3,3',4,4'-biphenyltetracarboxylic dianhydride, bis(3,4-dicarboxyphenyl) ether dianhydride and 4,4'-(p-phenylenedioxy)diphthalic dianhydride. The tetracarboxylic dianhydride may be used singly or in combination of two or more Dicarboxylic anhydride used in the method of this invention includes, for example, malonic anhydride, succinic anhydride, glutaric anhydride, adipic anhydride, pimelic anhydride, suberic anhydride, azelaic anhydride, sebacic anhydride, methylmalonic anhydride, ethylmalonic anhydride, dimethylmalonic anhydride, methylsuccinic anhydride, 2,2-dimethylsuccinic anhydride, 2,3-dimethylsuccinic anhydride, tetramethylsuccinic anhydride, maleic anhydride, citraconic anhydride, glutaconic anhydride, methylenesuccinic anhydride, allylmalonic anhydride, tellaconic anhydride, muconic anhydride, 1,2-cyclobutanedicarboxylic anhydride, 1,2-cyclohexanedicarboxylic anhydride, cyclohexenedicarboxylic anhydride, camphoric anhydride, phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride.

Preferred anhydrides for use in the process of this invention include glutaric anhydride, citraconic anhydride, tetraconic anhydride, 1,2-cyclobutanedicarboxylic anhydride, 1,2-hexanedicarboxylic anhydride, phthalic anhydride, 3,4-benzophenonedicarboxylic anhydride, 3,4-dicarboxyphenyl phenyl ether anhydride, 3,4-biphenyldicarboxylic anhydride, 3,4-dicarboxyphenyl phenyl sulfide anhydride and 3,4-dicarboxyphenyl phenyl sulfone. The above mentioned dicarboxylic anhydride may be used singly or in combination of the two or more.

Preferably, the molar ratio of the aromatic diamine, tetracarboxylic dianhydride and dicarboxylic anhydride are from about 0.9 to about 1.0 mole of tetracarboxylic dianhydride and from about 0.001 to about 1.0 mole of dicarboxylic anhydride per mole of aromatic diamine.

In preparing the polyimide, the molar ratio of the aromatic diamine to the tetracarboxylic dianhydride is usually adjusted to control the molecular weight of the polyimide formed. In the method of this invention, when the molar ratio of the tetracarboxylic dianhydride to the aromatic diamine is in the range of from about 0.9 to about 1.0 a polyimide having good melt viscosity is obtained.

The amount of dicarboxylic anhydride simultaneously present in the reaction is preferably in the range of from about 0.001 to about 1.0 mole per mole of aromatic diamine. When the amount is less than 0.001 mole, heat stability in the molten state of polyimide which is the object of this invention may not be obtained. When the molar ratio of the dicarboxylic anhydride to the aromatic diamine is greater than 1.0 the mechanical properties of molded products are not as good. Most preferably, the molar ratio of the dicarboxylic anhydride to the aromatic diamine is from about 0.01 to about 0.05 mole of dicarboxylic anhydride per mole of aromatic diamine.

Suitable organic solvents for use in the method of this invention include.

N,N-dimethylformamide, N,N-dimethylacetamide, N,N-diethylacetamide, N,N-dimethylmethoxyacetamide, N-methyl-2-pyrolidone, 1,3-dimethyl-2-imidazolidinone, N-methylcaprolactam, 1,2-dimethoxyethane, bis(2-methoxyethyl) ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, m-cresol, p-cresol, p-chlorophenol and anisole. The organic solvents may be used singly or in combination.

In the method of this invention, the starting materials, e.g. the aromatic diamine, tetracarboxylic dianhydride and dicarboxylic anhydride are added to the organic solvent and reacted. The reaction can be carried out by any of the following methods.

(a) After reacting aromatic diamine with tetracarboxylic dianhydride, dicarboxylic anhydride is added and reacted.
(b) After reacting aromatic diamine with dicarboxylic anhydride, tetracarboxylic dianhydride is added and reacted.
(c) Aromatic diamine, tetracarboxylic dianhydride and dicarboxylic anhydride are reacted at the same time.

The reaction temperature is preferably in the range of from about 0° to about 250° C. and preferably 60° C. or less.

Any reaction pressure may be used and ambient pressure is enough to carry out the reaction.

The reaction time is dependent upon the aromatic diamine, tetracarboxylic dianhydride, dicarboxylic anhydride, solvent and reaction temperature. Preferably, the reaction time is from about 4 to about 24.

Polyamic acid is formed by the above mentioned reaction. The resultant polyamic acid is dehydrated by heating at 100° to 400° C. or chemically imidized by using a usual imidizing agent such as acetic anhydride. The polyimide obtained consists primarily of recurring units of the formula:

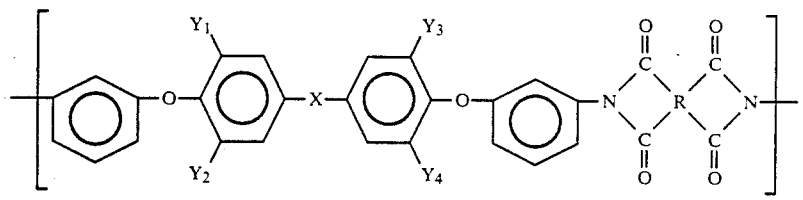

wherein X, $Y_1$, $Y_2$, $Y_3$ $Y_4$ and R are as above defined.

The polyamic acid is generally formed at low temperatures and then thermally or chemically imidized. The polyimide, however, can also be obtained by simultaneously conducting the formation and thermal imidization of the polyamic acid at a temperature of from about 60° to about 250° C. In this method, an aromatic diamine, tetracarboxylic dianhydride and dicarboxylic anhydride are suspended or dissolved in an organic solvent and reacted by heating. Thus formation and imidization of the polyamic acid are carried out at the same time and produce a polyimide consisting primarily of the recurring units of the above formula.

When the polyimide of this invention is processed by fusion molding, other thermoplastic resins may be incorporated in a suitable amount depending upon the application so long as no adverse effects occur contrary to the objects of this invention. Illustrative examples of thermoplastic resins suitable for use with the polyimide include polyethylene, polypropylene, polycarbonate, polyarylate, polyamide, polysulfone, polyethersulfone, polyetherketone, polyphenylenesulfide, polyamideimide, polyetherimide and modified polyphenyleneoxide.

Fillers which are used for usual resin compositions may be employed in amounts which have no adverse effects on the objects of this invention. Suitable fillers include wear resistance improvers such as graphite, carborundum, quartz powder, molybdenum disulfide and fluororesins; reinforcing materials such as glass fiber, carbon fiber, boron fiber, silicon carbide fiber, carbon whisker, asbestos, metal fiber and ceramic fiber; flame retardants such as antimony trioxide, magnesium carbonate and calcium carbonate; electrical property improvers such as clay and mica; tracking resistance improvers such as barium sulfate, silica and calcium metasilicate; thermal conductivity improvers such as iron powder, zinc powder, aluminum powder and copper powder; and other miscellaneous additives such as glass beads, glass spheres, talc, diatomaceous earth, alumina, silicate balloon, hydrated alumina, metal oxides and coloring agents.

The present invention also relates to a polyimide composite material comprising a polyamide made by the process of the invention and a fibrous reinforcing material.

Fibrous reinforcing materials suitable for use with the polyimide composite material in this invention include, for example, glass fibers such as E-glass, S-glass, T-glass, C-glass and AR-glass; carbon fibers such as polyacrylonitrile base, pitch base and rayon base carbon fibers; aromatic polyamide fibers represented by Kevler (Trade mark of E.I. Du Pont de Numeours & Co.); silicon carbide fibers such as Nicalon (Trade mark of Nippon Carbon Co.); metallic fibers such as stainless steel fibers; alumina fibers and boron fibers. These fibers are used as unidirectional long fibers such as yarn, bundled unidirectional long fibers such as roving, tow and multidirectional continuous fibers such as textiles, mats and felts.

These fibrous reinforcing materials are used singly or in combination.

These reinforcing materials should be selected to achieve the desired properties of the molded articles such as strength, elastic modulus, elongation at break, electrical properties and density. For example, carbon fibers or glass fibers are preferred when high values are required for specific strength and specific modulus of elasticity. Carbon fibers and metal fibers are preferred when shielding property for electromagnetic field is required. Glass fibers are preferred when electrical insulation properties are required.

Fiber diameter and collected number of fibers depend upon the raw materials of fibers. For example, carbon fibers generally have a fiber diameter of 4 to 8 μm and a collected number of 1,000 to 12,000. Finer diameter of fibers is preferred due to favorable effect on the mechanical properties of the molded articles obtained.

Surface treatment of the fibrous reinforcing materials is favorable for improving affinity with the polyimide. For example, surface treatment with silane base or titanate base coupling agent is particularly preferred for glass fibers.

Preferably, the fibrous reinforcing materials are present in the composite material in an amount of from about 5% to about 85%, more preferably in an amount of from about 30% to about 70% by the volume of the composite material. When volume content of the fibrous a reinforcing materials is low, reinforcing effect cannot be expected. When the volume content is too high, the interlayer strength of molded articles decreases severely.

Any previously known method can be used for the preparation of the composite material from the polyimide and the fibrous reinforcing material.

For example, the fused impregnation method may be employed wherein the fibrous reinforcing material is impregnated with the polyimide in a molten state. In the fluidized bed method, impregnation is carried out by using the polyimide powder in a state of floating in the air or suspending in a liquid such as water. In the fluidized bed method, the impregnated fibrous reinforcing material is dried, if necessary, and then the polyimide in the fibrous reinforcing material is fused by heating. This process is particularly effective for providing the integrated polyimide composite material. Finer particle size is desired for the polyimide powder at the impregnation. The preferred particle size is less than the diameter of the fibrous monofilament.

In another method, the powder or a film of the polyimide is placed on one or both sides of the fibrous reinforcing material and pressed with heating. When the fibrous reinforcing material is a fabric, the polyimide powder or film is alternately piled up with necessary sheets of the fabric to form the desired thickness of the article to be molded and is then pressed with heating. Thus impregnation and molding can be conducted at the same time and molded articles having a uniform resin dispersion can be obtained.

Further methods for the fused impregnation have been representatively described in Nakakura et al.; Japanese Laid-Open Patent 61-229534, 61-229536 (1986) and Koba et al.; Japanese Patent Application 62-216253 (1987) which corresponds to copending United States patent application Ser. No. 189,955 filed on May 3, 1988. As an example of these method, the fibrous reinforcing material is impregnated by being contacted with the molten resin on the surface of a hot roll or hot belt.

Specifically, a fiber sheet obtained by paralleling unidirectional long fibers such as tow which are drawn out of several bobbins or a multidirectional continuous fiber is applied a given tension in the direction of take-up with a tension adjusting roll. The polyimide is fused by heating in an extruder. The fused polyimide is then extruded through a die and applied to a lower belt on the surface of a hot roll maintained at a prescribed temperature. Successively the above mentioned fiber sheet or multidirectional continuous fiber is impregnated by passing through one or more hot rolls in a sandwiched condition between the upper and lower pair of belts. The continuous impregnation method is particularly preferred.

The composite material thus obtained is piled up and pressed with heating to obtain molded articles of desired shapes.

EXAMPLES

The present invention will be further clarified by the following examples which are intended to be purely exemplary of the invention.

EXAMPLE 1

To a reaction vessel equipped with a stirrer, reflux condenser and nitrogen inlet tube, 379 g (1.03 mole) of 4,4'-bis(3-aminophenoxy)biphenyl and 5,371 g of N,N-dimethylacetamide as a solvent were charged. Then 217.8 g (1.00 mole) of pyromellitic dianhydride were added by portions at room temperature in a nitrogen atmosphere so as not to raise the temperature of the solution and were stirred for about 20 hours at the room temperature.

To the polyamic acid solution thus obtained 17.6 g (0.155 mole) of glutaric anhydride were added at room temperature in a nitrogen atmosphere and further stirred for an hour. Then 202 g (2 moles) of triethylamine and 306 g (3 moles) of acetic anhydride were added dropwise to the solution. Yellow polyimide powder started to precipitate after about one hour from the completion of dropwise addition. The reaction mixture was further stirred for 10 hours at the room temperature. The resultant slurry was filtered, washed with methanol and dried at 180° C. for 2 hours. The polyimide powder obtained was 547 g. The polyimide powder had a glass transition temperature of 253° C., a melting point of 378° C. by DSC method and an inherent viscosity of 0.52 dl/g. The inherent viscosity was measured at 35° C. in a solvent mixture (90/10 weight ratio of p-chlorophenol/phenol) at a concentration of 0.5 g/100 ml solvent.

The relationship between the shear rate and the melt viscosity of the polyimide powder thus obtained was measured by using a Japan Polymer Society type flow-tester (Trade mark, CFT-500; a product of Shimadzu Seisakusho Co.) with an orifice having a diameter of 0.1 cm and a length of 1 cm. After being maintained at 420° C. for 5 minutes, the melt viscosity was measured at various shear rates. The relationship between melt viscosity and shear rate is illustrated by curve A in FIG. 1.

Comparative Example 1

The same procedures as described in Example 1 were carried out without using glutaric anhydride. The polyimide powder obtained was 545 g and had an inherent viscosity of 0.52 dl/g. By using the polyimide powder, the relationship between the melt viscosity and the shear rate was measured with the flow tester as in Example 1. The results are illustrated by curve B in FIG. 1.

Curve B indicates a higher melt viscosity at lower shear rates (around $10^2$ 1/sec ) than Curve A, which means difficulty of processing in Comparative Example 1.

EXAMPLE 2

To a reaction vessel equipped with a stirrer, reflux condenser and nitrogen inlet tube, 368 g (1.0 mole) of 4,4'-bis(3-aminophenoxy)biphenyl and 5,215 g of N,N-dimethylacetamide as a solvent were charged. Then 211.46 g (0.97 mole) of pyromellitic dianhydride was added by portions at room temperature in a nitrogen atmosphere so as not to raise the temperature of the solution and stirred for about 20 hours at room temperature.

To the polyamic acid solution thus obtained, 22.2 g (0.15 mole) of phthalic anhydride were added at the room temperature in a nitrogen atmosphere and further stirred for one hour. Then 404 g (4 moles) of triethylamine and 306 g (3 moles) of acetic anhydride were added dropwise to the solution. Yellow polyimide powder started to precipitate after about one hour from the completion of dropwise addition. The reaction mixture was further stirred for 10 hours at the room temperature. The resultant slurry was filtered, washed with methanol and dried at 180° C. for 2 hours. The polyimide powder obtained was 536 g. The polyimide powder had a glass transition temperature of 256° C., a melting point of 378° C. and an inherent viscosity of 0.53 dl/g.

Figure 2:
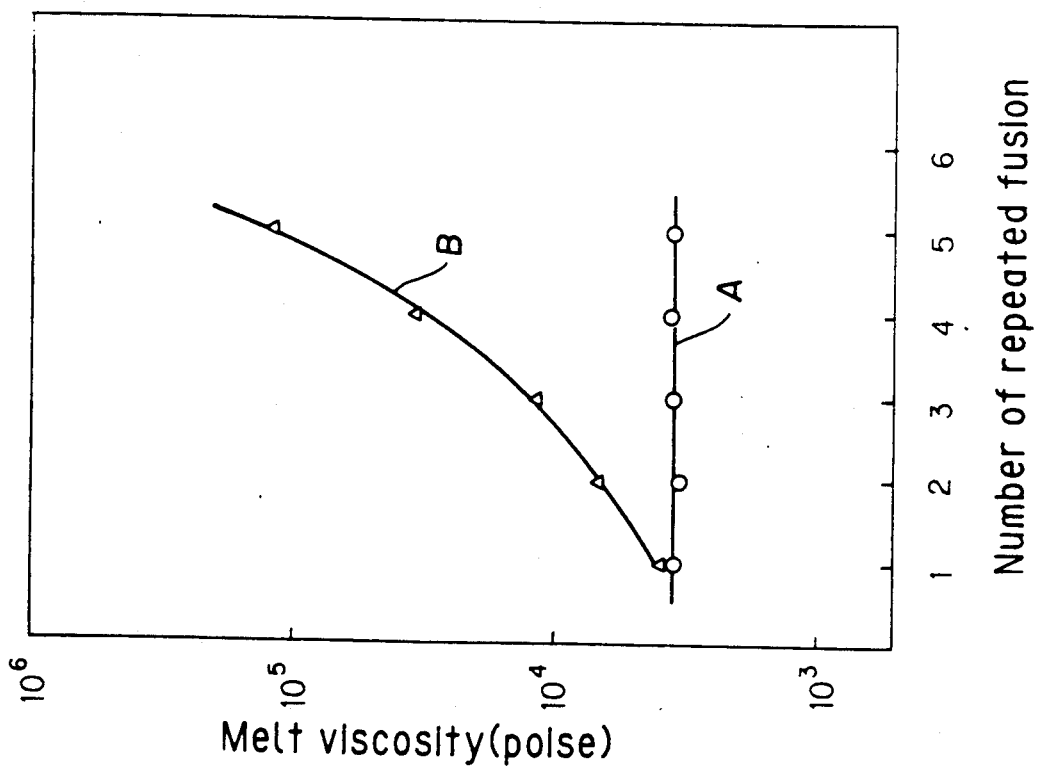
FIG. 2 and FIG. 6 illustrate the relationship between the melt viscosity and numbers of repeated fusion.

The melt viscosity of the polyimide powder thus obtained was repeatedly measured by using a Japan Polymer Society type flowtester. After holding at 420° C. for 5 minutes, the sample was extruded with a pressure of 100 kg/cm². The strand obtained was crushed and extruded again. The procedure was continuously repeated 5 times. The relationship between the repeated number and the melt viscosity is illustrated by Curve A in FIG. 2. Almost no variation is found in the melt viscosity even though repeated number is increased, which indicates good heat stability of the molten polyimide.

Comparative Example 2

The same procedures as described in Example 2 were carried out without phthalic anhydride. The polyimide powder obtained was 529 g and had an inherent viscosity of 0.52 dl/g.

The repeated measurement of the melt viscosity was carried out on the polyimide powder thus obtained by the method described in Example 2. The results are illustrated by Curve B in FIG. 2. The melt viscosity was increased with the increase of repeated number. The heat stability of the molten polyimide thus obtained was inferior to that obtained in Example 2.

EXAMPLE 3

To a reaction vessel equipped with a stirrer, reflux condenser and nitrogen inlet tube, 412 g (1.03 mole) of bis[4-(3-aminophenoxy)phenyl]sulfide and 5,747 g of N,N-dimethylacetamide as a solvent were charged. Then 217 g (1.0 mole) of pyromellitic dianhydride and 9.53 g (0.062 mole) of 1,2-cyclohexanedicarboxylic dianhydride were added at room temperature in a nitrogen atmosphere so as not to raise the temperature of the solution and stirred for 20 hours at room temperature. Then 202 g (2 moles) of triethylamine and 306 g (3 moles) of acetic anhydride were added dropwise to the solution. The reaction mixture was stirred for 20 hours at room temperature. The resultant light yellow slurry was filtered, washed with methanol and dried at 180° C. for 8 hours under reduced pressure. The light yellow polyimide powder thus obtained was 597 g. The polyimide powder has a glass transition temperature of 232° C. and an inherent viscosity of 0.49 dl/g.

The melt viscosity of the polyimide was measured at a cylinder temperature of 320° C., a residence time of 5 min and pressure of 100 kg/cm². The melt viscosity was 5,600 poises. kg/cm².

The heat stability of the molten polyimide was evaluated by measuring the variation of melt viscosity when the residence time of the molten polyimide was changed in the cylinder of the flow tester. The cylinder temperature was 320° C. The pressure at the measurement was 100 kg/cm². The results are illustrated by Curve A in FIG. 3. Almost no variation was found in the melt viscosity even though the residence time was extended, which indicates good heat stability of the molten polyimide.

Comparative Example 3

The same procedures as described in Example 3 were carried out without 1,2-cyclohexanedicarboxylic anhydride.

The light yellow polyimide powder thus obtained had a glass transition temperature of 235° C. and an inherent viscosity of 0.49 dl/g. The polyimide had a melt viscosity of 8,000 poises at cylinder temperature of 320° C., residence time of 5 minutes and under the pressure of 100 kg/cm².

The heat stability of the molten polyimide was evaluated by measuring the variation of melt viscosity when the residence time of the molten polyimide is changed in the cylinder of the flow tester. The melt viscosity was increased with the increase of residence time. The heat stability of the molten polyimide thus obtained was inferior to that obtained in Example 3. The results are illustrated by Curve B in FIG. 3.

EXAMPLE 4

To a reaction vessel equipped with a stirrer, reflux condenser and nitrogen inlet tube, 400 g (1.0 mole) of bis[4-(3-aminophenoxy)phenyl]sulfide and 5,580 g of N,N-dimethylacetamide as a solvent were charged. Then 8.88 g (0.06 mole) of phthalic anhydride and 211 g (0.97 mole) of pyromellitic dianhydride were added at room temperature in a nitrogen atmosphere so as not to raise the temperature of the solution and stirred for 20 hours at the room temperature.

Then 404 g (4 moles) of triethylamine and 306 g (3 moles) of acetic anhydride were added dropwise to the solution. The reaction mixture was stirred for 20 hours at room temperature. The resultant light yellow slurry was filtered, washed with methanol and dried at 180° C. for 8 hours under reduced pressure. The light yellow polyimide powder thus obtained was 580 g. The polyimide powder had a glass transition temperature of 235° C. and an inherent viscosity of 0.49 dl/g.

The heat stability of the molten polyimide was evaluated by measuring the variation of melt viscosity when the residence time of the molten polyimide was changed in the cylinder of the flow tester. The cylinder temperature was 320° C. The pressure at the measurement was 100 kg/cm². The results are illustrated by Curve A in FIG. 4. Almost no variation was found in the melt viscosity even though the residence time was extended, which indicates good heat stability of the molten polyimide.

Comparative Example 4

The same procedures as described in Example 4 were carried out without phthalic anhydride.

The light yellow polyimide powder thus obtained had a glass transition temperature of 235° C. and an inherent viscosity of 0.49 dl/g.

The heat stability of the molten polyimide was evaluated by measuring the variation of melt viscosity when the residence time of the molten polyimide was changed in the cylinder of the flow tester. The melt viscosity was increased with the increase of residence time. The heat stability of the molten polyimide thus obtained was inferior to that obtained in Example 4. The results are illustrated by Curve B in FIG. 4.

EXAMPLE 5

Figure 5:
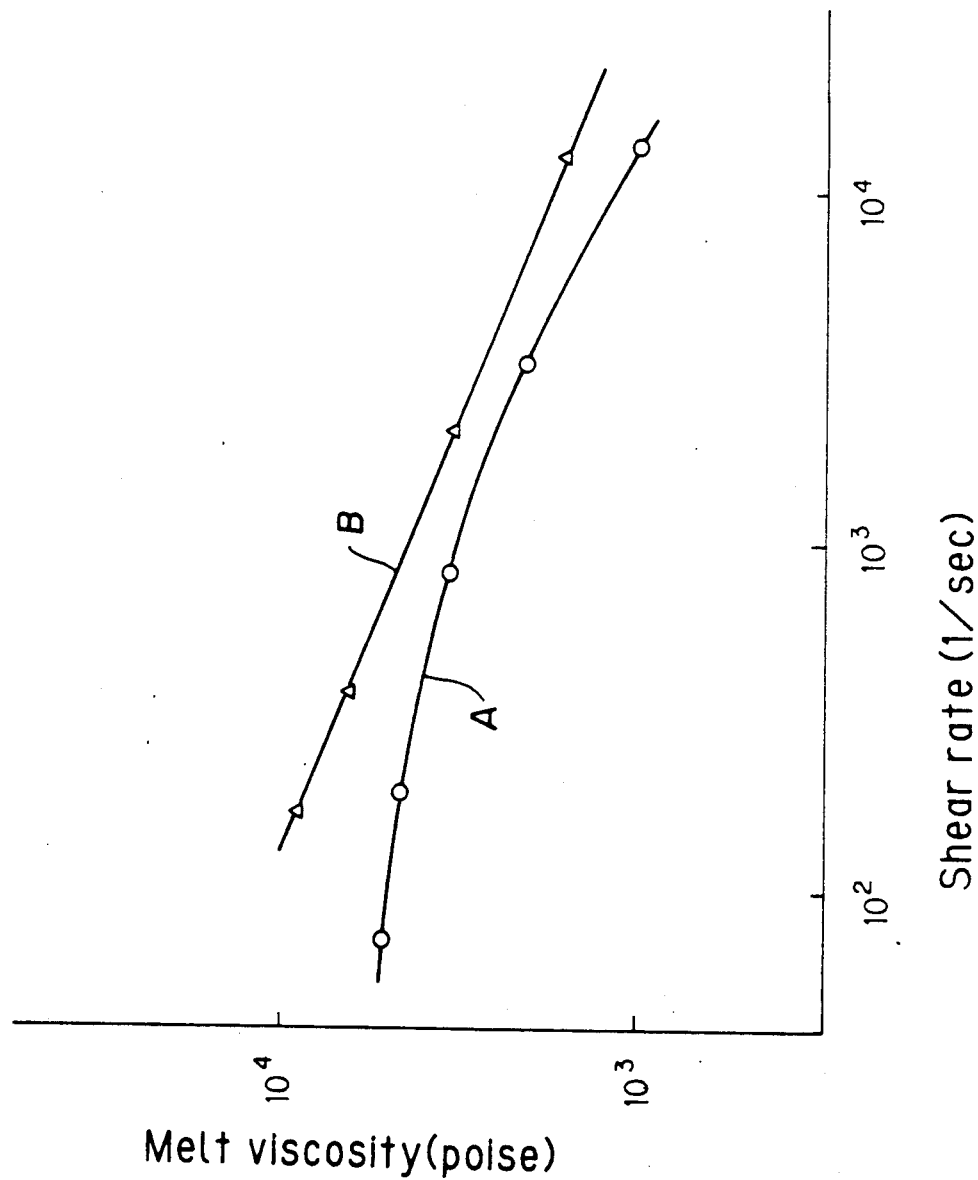

To a reaction vessel equipped with a stirrer, reflux condenser and nitrogen inlet tube, 400 g (1.03 moles) of bis[4-(3-aminophenoxy)phenyl]ketone, 310 g (1.00 mole) of bis(3,4-dicarboxyphenyl) ether dianhydride, 5.6 g (0.05 mole) of citraconic anhydride and 4,000 g of m-cresol were charged and gradually heated with stirring in a nitrogen atmosphere. A brown transparent homogeneous solution was obtained at about 120° C. The solution was heated to 150° C. Yellow polyimide powder was started to precipitate after stirring for about 20 minutes at this temperature. After stirring the reaction mixture for an additional 2 hours at 150° C. the precipitate was filtered, washed with methanol and then acetone, and dried at 180° C. for 8 hours under reduced pressure. The polyimide powder thus obtained was 676 g and had an inherent viscosity of 0.51 dl/g, and a glass transition temperature of 200° C. The relationship between the melt viscosity and the shear rate was measured at 280° C. by the same procedures as described in Example 1. The results obtained are illustrated by Curve A in FIG. 5.

Comparative Example 5

The same procedures as described in Example 5 were carried out without citraconic anhydride. The polyimide powder thus obtained had an inherent viscosity of 0.51 dl/g.

The relationship between the melt viscosity and the shear rate was measured by the same conditions as in Example 5. The results obtained are illustrated by Curve B in FIG. 5.

EXAMPLE 6

To a reaction vessel equipped with a stirrer, reflux condenser and nitrogen inlet tube, 396 g (1.0 mole) of bis[4-(3-aminophenoxy)phenyl]ketone, 300.7 g (0.97 mole) of bis(3,4-dicarboxyphenyl) ether dianhydride, 8.88 g (0.06 mole) of phthalic anhydride and 4,000 g of m-cresol were charged and gradually heated with stirring in a nitrogen atmosphere. A brown transparent homogenous solution was obtained at about 120° C. The solution was heated to 150° C. A yellow polyimide powder started to precipitate after stirring for about 20 minutes at 150° C. After stirring the reaction mixture for further 2 hours at the temperature, the precipitate was filtered, washed with methanol and then acetone, and dried at 180° C. for 8 hours under reduced pressure. The polyimide powder thus obtained was 662 g and had an inherent viscosity of 0.51 dl/g and a glass transition temperature of 201° C.

The repeated extrusion test with the flow tester was carried out at 280° C. under a pressure of 100 kg/cm² by using the same conditions as described in Example 2.

Figure 6:
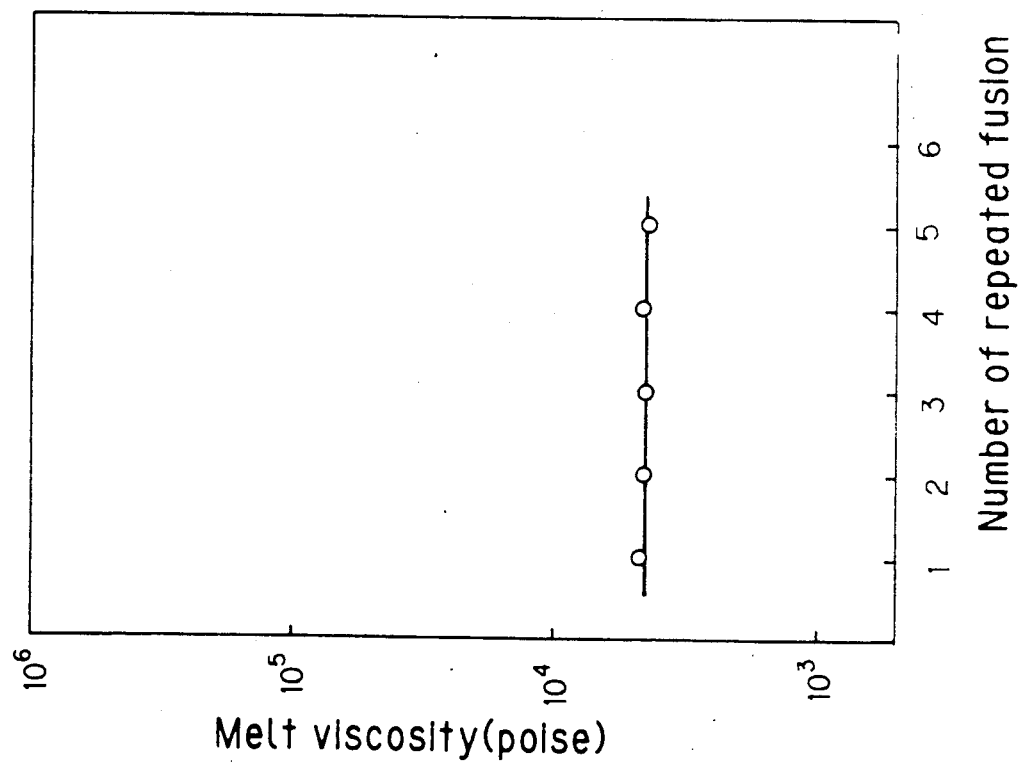

Almost no increase in the melt viscosity of the molten polyimide thus obtained was observed by the repeated extrusion. The results are illustrated in FIG. 6.

EXAMPLE 7

The polyimide powder was produced from 4,4'-bis(3-aminophenoxy)biphenyl, pyromellitic dianhydride and glutaric anhydride according to the procedure of Example 1.

Figure 7:
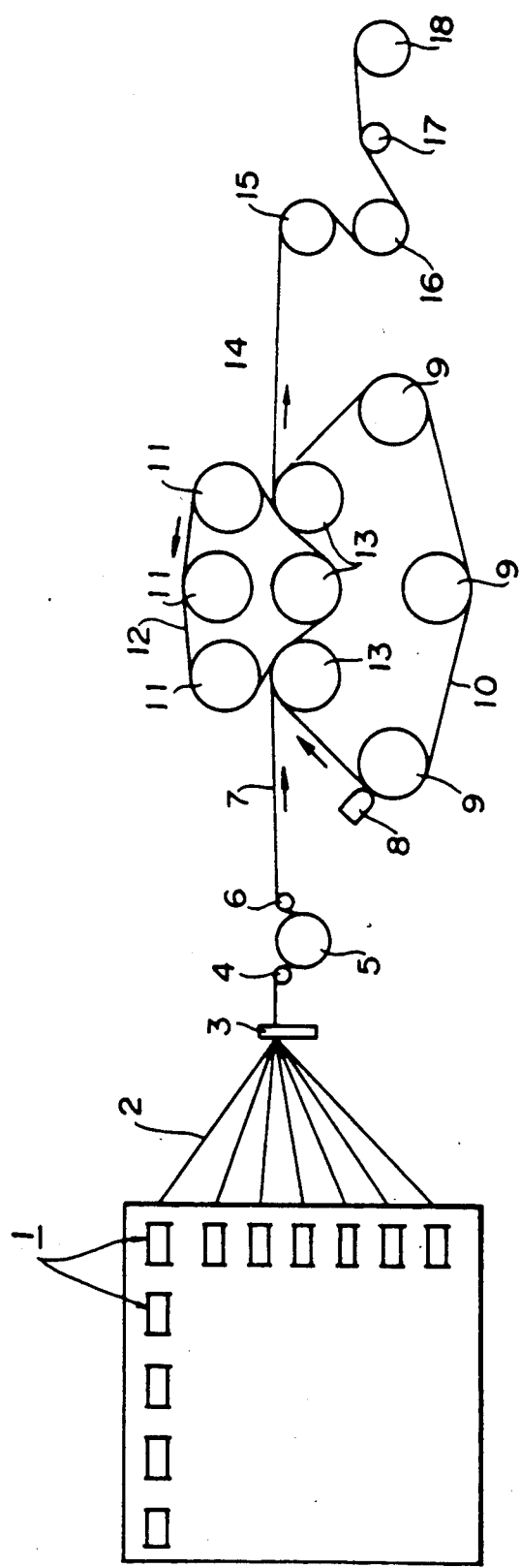
FIG. 7 shows an example of equipment for preparing the polyimide base composite material.

The composite material was manufactured from the polyimide thus obtained and carbon fibers by the following method. FIG. 7 illustrates an outline of the equipment used for the production.

Carbon fibers BESFIGHT HTA-7-3K (Trade mark of Toho Rayon Co.) are drawn from 100 bobbins (1), and 100 tows (2) are paralleled to one direction with an aligner (3) and passed through tension adjusting rolls (4, 5, 6) to make a fiber sheet (7) having a width of 150 mm.

Separately, the polyimide powder fused by heating in an extruder (not indicated in FIG. 7) was extruded from a die (8) and applied to the surface of a lower belt (10) with a thickness of 70 μm. The lower belt (10) was heated to 420° C. by three rolls (9) contacting with the lower belt (10), and the upper belt (12) was also heated to 420° C. by three rolls (11) contacting with the upper belt (12). Then the above obtained fiber sheet was sandwiched between the upper and lower belts, and passed through three impregnation rolls (13) at a rate of 20 cm/min under tension of 150 kg. The impregnation rolls (13) had a diameter of 240 mm and were heated to 350° C. The polyimide impregnated carbon fiber composite material (14) thus obtained was cooled, passed through take-up rolls (15, 16, 17) and wound up by the winding shaft (18).

The composite material thus obtained had a width of 150 mm and thickness of 0.13 mm.

Then 20 sheets of the above polyimide composite material were unidirectionally piled up and hot pressed at 400° C. for 20 minutes under pressure of 30 kg/cm² to obtain a plate having dimensions of 200×200×2.5 (thickness) mm. Volume percentage of the fibrous reinforcing material (hereinafter abbreviated as Vf), void ratio, flexural strength and flexural modulus were measured on the plate thus obtained. The plate had a Vf of 60%, void ratio of 1% or less, flexural strength of 191 kg/mm² and flexural modulus of 12,300 kg/mm². These results indicated good properties of the plate. Vf and void ratio were calculated from the density and weight percentage of the fibrous reinforcing material of the plate. Flexural strength and flexural modulus were measured in accordance with JIS K 7230.

EXAMPLE 8

The polyimide powder was produced from 4,4'-bis(3-aminophenoxy)biphenyl, pyromellitic dianhydride and phthalic anhydride according to the procedure of Example 2.

The same procedures as described in Example 7 were carried out for the manufacture of the composite material from the polyimide powder thus obtained and carbon fiber.

The operation for the manufacture of the composite material was continued for 5 hours. No change was observed during the operation on the flowability of molten polyimide. The resultant composite material could be smoothly wound up without fiber breakage. The composite material thus obtained had a width of 150 mm and a thickness of 0.13 mm.

Then 20 sheets of the above obtained polyimide composite material were unidirectionally piled up and hot pressed at 400° C. for 20 minutes under pressure of 50 kg/cm² to obtain a plate having dimensions of 200×200×2.5 (thickness) mm. The plate obtained had a Vf of 60%, void ratio of 1% or less, flexural strength of 195 kg/mm² and flexural modulus of 12,500 kg/mm². These results indicated good properties of the plate.

Comparative Example 6

The polyimide powder was produced from 4,4'-bis(3-aminophenoxy)biphenyl and pyromellitic dianhydride according to the procedure of Comparative Example 2.

The same procedures for the production of the composite material as described in Example 7 were carried out by using the polyimide powder thus obtained. After 30 minutes from the start of the operation, molten polyimide caused gelation and release of fibers from the upper and lower belts became difficult. Finally the operation was stopped. A part of the composite material formed in this operation was molded by the same procedures as described in Example 8 and its physical properties was evaluated. The molded plate had a Vf of 60%, void ratio of 6.5%, flexural strength of 98 kg/mm² and flexural modulus of 6,500 kg/mm². The extremely low strength and modulus resulted from a significant decrease in flowability and insufficient defoaming.

EXAMPLES 9-12

The polyimide composite materials were obtained by carrying out the same procedures as described in Example 7 except that the kinds of fibrous reinforcing materials and the applied thickness of the molten polyimide to the belt were changed as illustrated in Table 1. Thus a polyimide composite material was obtained. Several composite materials as illustrated in Table 1 were piled up and processed by the same procedures as described in Example 7. The properties of the plate obtained were shown in Table 1.

EXAMPLES 13-14

The same procedures as described in Example 7 were carried out except that the kinds of fibrous reinforcing materials and the applied thickness of the molten polyimide to the belt were changed as illustrated in Table 1, and the tension was changed to 30 kg. Thus Polyimide composite materials were obtained. Several composite material as illustrated in Table 1 were piled up and processed by the same procedures as described in FIG. 7. The properties of the plate thus obtained are illustrated in Table 1.

EXAMPLES 15-18

The same procedures as in Example 8 were carried out except that the kinds of fibrous reinforcing materials and the applied thickness of the molten polyimide to the belt were changed as illustrated in Table 1. Thus polyimide composite materials were obtained. Several of the composite materials as illustrated in Table 1 were piled up and processed by the same procedures as in Example 8. Properties of the plate thus obtained are illustrated in Table 1.

EXAMPLES 19-20

The same procedures as Example 8 were carried out except that the kinds of fibrous reinforcing materials and the applied thickness of the molten polyimide to the belt were changed as illustrated in Table 1, and the tension was changed to 30 kg. Thus polyimide composite materials were obtained. Several of the composite material as illustrated in Table 1 were piled up and processed by the same procedures as Example 8. Properties of the plate thus obtained are illustrated in Table 1.

EXAMPLE 21

An aluminium frame having inside dimensions of 30 cm x 30 cm and a thickness of 1.0 mm was placed on a heat resistant release film of 50 μm thick, and 5 g of the polyimide powder obtained in Example 1 was uniformly dispersed within the frame. Then the frame was removed, and a carbon fiber fabric BESFIGHT W-3101 (Trade mark of Toho Rayon Co.) was placed on the polyimide powder dispersed above. Another 5 g of the polyimide powder was uniformly dispersed on the above fabric. A commercial heat resistant release film was put on the dispersed polyimide powder and pressed in a metal mold at 400° C. for 10 minutes with the pressure of 70 kg/cm². After cooling to 250° C. with the same pressure, the molded product was taken out of the mold and the release films were removed.

The composite material thus obtained was divided into 6 portions, piled up and processed by the same procedures as described in Example 1. The resultant plate had a Vf of 60%, flexural strength of 82 kg/mm² and flexural modulus of 6,300 kg/mm².

TABLE 1

| Example | Fibrous reinforcing material | | | Volume content (%) | Number of piled sheet | Flexural strength (kg/mm²) | Flexural modulus (kg/mm²) |
|---|---|---|---|---|---|---|---|
| | Applied thickness | Material | Form | | | | |
| 9 | 200 | Carbon fiber | Tow | 30 | 12 | 93 | 6,200 |
| 10 | 40 | Carbon fiber | Tow | 70 | 26 | 215 | 13,500 |
| 11 | 105 | Glass fiber | Roving | 60 | 12 | 141 | 5,000 |
| 12 | 80 | Aromatic polyamide fiber | Roving | 60 | 12 | 70 | 5,700 |
| 13 | 100 | Carbon fiber | Plain woven fabric | 60 | 16 | 85 | 6,500 |
| 14 | 70 | Glass fiber | Plain woven fabric | 60 | 22 | 67 | 2,300 |
| 15 | 200 | Carbon fiber | Tow | 30 | 12 | 96 | 6,300 |
| 16 | 40 | Carbon fiber | Tow | 70 | 26 | 217 | 13,600 |
| 17 | 105 | Glass fiber | Roving | 60 | 12 | 142 | 5,100 |
| 18 | 80 | Aromatic polyamide fiber | Roving | 60 | 12 | 71 | 6,000 |
| 19 | 100 | Carbon fiber | Plain woven fabric | 60 | 16 | 85 | 6,800 |
| 20 | 70 | Glass fiber | Plain woven | 60 | 22 | 68 | 2,400 |

TABLE 1-continued

| Example | Fibrous reinforcing material | | | | Number of piled sheet | Flexural strength (kg/mm$^2$) | Flexural modulus (kg/mm$^2$) |
|---|---|---|---|---|---|---|---|
| | Applied thickness | Material | Form | Volume content (%) | | | |
| | | | fabric | | | | |

EXAMPLE 22

The same procedures as described in Example 21 were carried out except that the polyimide powder obtained in Example 2 was used in place of the polyimide powder obtained in Example 1.

The plate thus obtained had a Vf of 60%, flexural strength of 83 kg/mm$^2$ and flexural modulus of 6,500 kg/mm$^2$.

EXAMPLE 23

In Example 2, 315 g (0.98 mole) of 3,3',4,4'-benzophenonetetracarboxylic dianhydride was used in place of 211.46 g of pyromellitic dianhydride. The polyimide powder was 617 g and had an inherent viscosity of 0.53 dl/g.

The polyimide powder produced according to the procedure above was subjected to impregnation process by the same procedures as described in Example 7 except that impregnation temperature was changed to 400° C. The operation was smoothly continued for 5 hours. No change was observed on the flowability of the molten polyimide resin during the operation.

The polyimide composite material thus obtained was hot pressed by the same procedures as Example 7 except that the temperature was changed to 380° C. The plate obtained had a flexural strength of 190 kg/mm$^2$ and a flexural modulus of 12,100 kg/mm$^2$.

Comparative Example 7

The same procedures as Example 23 were carried out without phthalic anhydride. The polyimide powder thus obtained had an inherent viscosity of 0.53 dl/g.

The same procedures for the production of the composite material as described in Example 7 were carried out by using the polyimide powder thus obtained. After about 20 minutes from the start of the operation, molten polyimide caused gelation and release of fibers from the upper and lower belts became difficult. Finally the operation was stopped. A part of the composite material formed in the operation was molded by the same procedures as Example 8 and the physical properties were evaluated. The molded plate had a Vf of 59%, void ratio of 6.8%, flexural strength of 95 kg/mm$^2$ and flexural modulus of 5,800 kg/mm$^2$. The extremely low strength and modulus were resulted from significant decrease in flowability and insufficient defoaming of the molten polyimide.

EXAMPLE 24

The polyimide powder was produced from bis[4-(3-aminophenoxy)phenyl] sulfide, pyromellitic dianhydride and 1,2-cyclohexanedicarboxylic anhydride according to the procedure of Example 3.

The polyimide powder was subjected to impregnation process by the same procedures as described in Example 7 except that impregnation temperature was changed to 340° C. Then the resultant composite material was hot pressed by the same procedures as Example 7 except that the temperature was changed to 320° C.

The plate thus obtained had a flexural strength of 180 kg/mm$^2$ and flexural modulus of 11,100 kg/mm$^2$.

EXAMPLE 25

The polyimide powder was produced from bis[4-(3-aminophenoxy)phenyl] sulfide, pyromellitic dianhdyride and phthalic anhydride according to the procedure of Example 4.

The polyimide powder thus obtained was subjected to impregnation process by the same procedures as described in Example 7 except that impregnation temperature was changed to 340° C. The implegnating operation was smoothly continued for 5 hours. No change was observed on the flowability of the molten polyimide during the operation.

The composite material thus obtained was then hot pressed by the same procedures as described in Example 8 except that the temperature was changed to 320° C. The plate thus obtained had a flexural strength of 182 kg/mm$^2$ and a flexural modulus of 11,300 kg/mm$^2$.

Comparative Example 8

The polyimide powder was produced from bis[4-(3-aminophenoxy)phenyl] sulfide and pyromellitic dianhydride according to the procedure of Comparative Example 4.

The same procedures for the production of the composite material as described in Example 7 were carried out by using the polyimide powder thus obtained. After about 35 minutes from the start of operation, molten polyimide caused gelation and release of fibers from the upper and lower belts became difficult. Finally the operation was stopped.

A part of the composite material formed in the operation was molded by the same procedures as Example 8 and evaluated physical properties. The molded plate had a Vf of 60%, void ratio of 4.9%, flexural strength of 98 kg/ma2 and flexural modulus of 6,700 kg/mm$^2$. The extremely low strength and modulus were resulted from significant decrease in flowability and insufficient defoaming of the molten polyimide.

EXAMPLE 26

The polyimide powder was produced from bis[4-(3-aminophenoxy)phenyl] ketone, bis(3,4-dicarboxyphenyl) ether dianhydride and citraconic anhydride according to the procedure of Example 5.

The polyimide powder thus obtained was subjected to impregnation process by the same procedures as described in Example 7 except that impregnation temperature was changed to 320° C.

The composite material thus obtained was then hot pressed by the same procedures as described in Example 7 except that the temperature was changed to 300° C. The plate thus obtained had a flexural strength of 173 kg/mm$^2$ and a flexural modulus of 10,300 kg/mm$^2$.

EXAMPLE 27

The polyimide powder was produced from bis[4-(3-aminophenoxy)phenyl] ketone, bis(3,4-dicarboxyphenyl) ether dianhydride and phthalic anhydride according to the procedure of Example 6.

The polyimide powder thus obtained was subjected to impregnation process by the same procedures as described in Example 7 except that impregnation temperature was changed to 320° C. The impregnation operation was smoothly continued for 5 hours. No change was observed on the flowability of the molten polyimide during the operation.

The composite material thus obtained was then hot pressed by the same procedures as described in Example 8 except that the temperature was changed to 300° C. The plate thus obtained had a flexural strength of 179 kg/mm$^2$ and a flexural modulus of 10,900 kg/m$^2$.

What is claimed is:

1. A process for preparing a polyimide comprising reacting
   (a) at least one aromatic diamine represented by the formula (I)

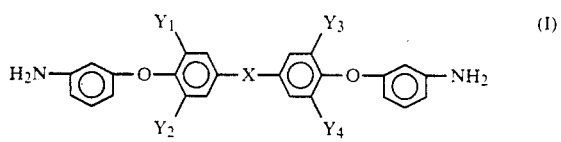

wherein X represents a direct bond or a radical selected from the group consisting of a $C_1-C_{10}$ divalent hydrocarbon radical, a hexafluorinated isopropylidene radical, a carbonyl radical, a thio radical and a sulfonyl radical; and Y$_1$ a process for preparing a polyimide comprising reacting
   (a) at least one aromatic diamine represented by the formula (I)

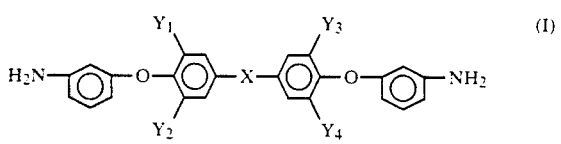

wherein X represents a direct bond or a radical selected from the group consisting of a $C_1-C_{10}$ divalent hydrocarbon radical, a hexafluorinated isopropylidene radical, a carbonyl radical, a thio radical and a sulfonyl radical; and Y$_1$, Y$_2$, Y$_3$ and Y$_4$ may be the same or different and represent a radical selected from the group consisting of a hydrogen atom, a lower alkyl radical, a lower alkoxy radical, a chlorine atom and a bromine atom;
   (b) at least one tetracarboxylic dianhydride represented by the formula (II)

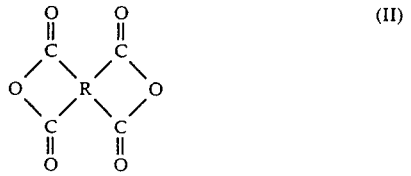

wherein R represents a tetravalent radical selected from the group consisting of an aliphatic radical having at least two carbon atoms, a cyclic aliphatic radical, a monocyclic aromatic radical, a fused polycyclic aromatic radical, a polycyclic aromatic radical wherein the aromatic rings are linked together directly or by a bridged member; and
   (c) at least one dicarboxylic anhydride represented by the formula (III)

wherein Z represents a divalent radical selected from the group consisting of an aliphatic radical, a cyclic aliphatic radical, a monocyclic aromatic radical, a fused polycyclic aromatic radical and a polycyclic aromatic radical wherein the aromatic rings are linked together directed or via a bridged member; to form a polyamic acid; and dehydrating or imidizing said polyamic acid to form a polyimide.

2. The process of claim 1 wherein the molar ratio of said tetracarboxylic dianhydride to said aromatic diamine is from about 0.9 to about 1.0 mole of tetracarboxylic dianhydride per mole of aromatic diamine.

3. The process of claim 1 wherein the molar ratio of said dicarboxylic anhydride to said aromatic diamine is from about 0.001 to about 1.0 mole of dicarboxylic anhydride per mole of aromatic diamine.

4. The process of claim 3 wherein said molar ratio is from about 0.01 to about 0.5 mole of dicarboxylic anhydride per mole of aromatic diamine.

5. The process of claim 2 wherein the molar ratio of said dicarboxylic anhydride to said aromatic diamine is from about 0.001 to about 1.0 mole of dicarboxylic anhydride per mole of aromatic diamine.

6. The process of claim 1 wherein said aromatic diamine is selected from the group consisting of 4,4'-bis(3-aminophenoxy)biphenyl, 2,2-bis[4-(3-aminophenoxy)phenyl]propane, bis[4-(3-aminophenyoxy)phenyl]ketone, bis[4-(3-aminophenoxy)phenyl]sulfide and bis[4-(3-aminophenoxy)phenyl]-sufone.

7. The process of claim 1 wherein said tetracarboxylic dianhydride is selected from the group consisting of pyromellitic dianhydride, 3,3',4,4'-benzophenonetetracarboxylic dianhydride, 3,3',4,4'-biphenyltetracarboxylic dianhydride, bis(3,4-dicarboxyphenyl)ether dianhydride and 4,4'-(p-phenylenedioxy)diphthalic dianhydride.

8. The process of claim 1 wherein said dicarboxylic anhydride is selected from the group consisting of glutaric anhydride, citraconic anhydride, tetraconic anhydride, 1,2-cyclobutanedicarboxylic anhydride, 1,2-hexanedicarboxylic anhydride, pthalic anhydride, 3,4-benzophenonedicarboxylic anhydride, 3,4-dicarboxyphenyl phenyl ether anhydride, 3,4-biphenyldicarboxylic anhydride, 3,4-dicarboxyphenyl phenyl sulfide anhydride and 3,4-dicarboxyphenyl phenyl sulfone.

9. The process of claim 1 wherein the reaction temperature is from about 0° C. to about 250° C.

10. The process of claim 9 wherein the reaction temperature is no greater than about 60° C.

11. The process of claim 1 wherein the reaction time is from about 4 hours to about 24 hours.

12. The process of claim 1 wherein said polyamic acid is dehydrated by heating at a temperature of from about 100° C. to about 400° C.

13. A process for preparing a polyimide comprising reacting in an organic solvent at a temperature of from about 60° C. to about 250° C.

(a) at least one aromatic diamine represented by the formula (I)

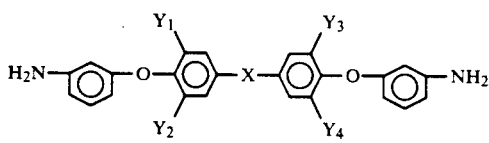

wherein X represents a direct bond or a radical selected from the group consisting of a $C_1$–$C_{10}$ divalent hydrocarbon radical, a hexafluorinated isopropylidene radical, a carbonyl radical, a thio radical and a sulfonyl radical; and $Y_1$, $Y_2$, $Y_3$ and $Y_4$ may be the same or different and represent a radical selected from the group consisting of a hydrogen atom, a lower alkyl radical, a lower alkoxy radical, a chlorine atom and a bromine atom;

(b) at least one tetracarboxylic dianhydride represented by the formula (II)

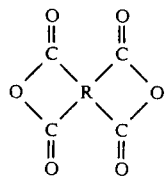

wherein R represents a tetravalent radical selected from the group consisting of an aliphatic radical having at least two carbon atoms, a cyclic aliphatic radical, a monocyclic aromatic radical, a fused polycyclic aromatic radical, a polycyclic aromatic radical wherein the aromatic rings are linked together directly or by a bridged member; and (c) at least one dicarboxylic anhydride represented by the formula (III)

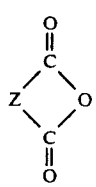

wherein Z represents a divalent radical selected from the group consisting of an aliphatic radical, a cyclic aliphatic radical, a monocyclic aromatic radical, a fused polycyclic aromatic radical and a polycyclic aromatic radical wherein the aromatic rings are linked together directed or via a bridged member; to form a polyimide.

14. The process of claim 13 wherein the molar ratio of said tetracarboxylic dianhydride to said aromatic diamine is from about 0.9 to about 1.0 mole of tetracarboxylic dianhydride per mole of aromatic diamine.

15. The process of claim 13 wherein the molar ratio of said dicarboxylic anhydride to said aromatic diamine is from about 0.001 to about 1.0 mole of dicarboxylic anhydride per mole of aromatic diamine.

16. The process of claim 15 wherein said molar ratio is from about 0.01 to about 0.5 mole of dicarboxylic anhydride per mole of aromatic diamine.

17. The process of claim 14 wherein the molar ratio of said dicarboxylic anhydride to said aromatic diamine is from about 0.001 to about 1.0 mole of dicarboxylic dianhydride per mole of aromatic diamine.

18. The process of claim 13 wherein said aromatic diamine is selected from the group consisting of 4,4'-bis(3-aminophenoxy)biphenyl, 2,2-bis[4-(3-aminophenoxy)phenyl]propane, bis[4-(3-aminophenoxy)phenyl]ketone, bis[4-(3-aminophenoxy)phenyl]sulfide and bis[4-(3-aminophenoxy)phenyl]-sulfone.

19. The process of claim 13 wherein said tetracarboxylic dihydride is selected from the group consisting of pyromellitic dianhydride, 3,3'4,4'-benzophenoetetracarboxylic dianhydride, 3,3',4,4'-biphenyltetracarboxylic dianhydride, bis(3,4-dicarboxyphenyl)ether dianhdyride and 4,4'-(p-phenylenedioxy)diphthalic dianhydride.

20. The process of claim 3 wherein said dicarboxylic anhydride is selected from the group consisting of glutaric anhydride, citraconic anhydride, tetraconic anhydride, 1,2-cyclobutanedicarboxylic anhydride, 1,2-hexanedicarboxylic anhydride. pthalic anhydride, 3,4benzophenonedicarboxylic anhydride, 3,4-dicarboxyphenyl phenyl ether anhydride, 3,4-biphenyldicarboxylic anhydride, 3,4dicarboxyphenyl phenyl sulfide anhydride and 3,4dicarboxyphenyl phenyl sulfone.

21. A polyimide composition prepared by the process of claim 1 comprising recurring units represented by the formula

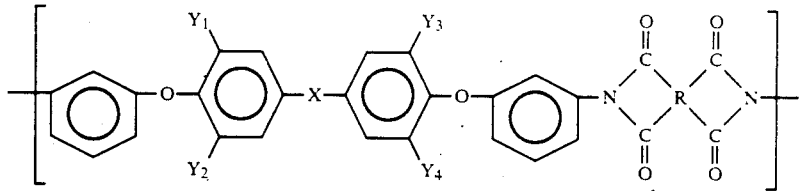

wherein X represents a direct bond or a radical selected from the group consisting of a $C_1$–$C_{10}$ divalent hydrocarbon radical, a hexafluorinated isopropylidene radical, a carbonyl radical, a thio radical and a sulfonyl radical; $Y_1$, $Y_2$, $Y_3$ and $Y_4$ may be the same or different and represent a radical selected from the group consisting of a hydrogen atom, a lower alkyl radical, a lower alkoxy radical, a chlorine atom and a bromine atom; and R represents a teteravalent radical selected from the group consisting of an aliphatic radical and having 2 or more carbon atoms, a cyclic aliphatic radical, a monocyclic aromatic radical wherein the aromatic rings are linked together directly or by a bridged member.

22. A polyimide composition prepared by the process of claim 1 comprising recurring units represented by the formula

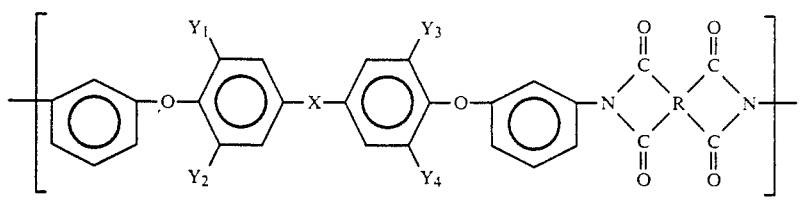

wherein X represents a direct bond or a radical selected from the group consisting of a $C_1$-$C_{10}$ divalent hydrocarbon radical, a hexafluorinated isopropylidene radical, a carbonyl radical, a thio radical and a sulfonyl radical; $Y_1$, $Y_2$, $Y_3$ and $Y_4$ may be the same or different and represent a radical selected from the group consisting of a hydrogen atom, a lower alkyl radical, a lower alkoxy radical, a chlorine atom and a bromine atom; and R represents a teteravalent radical selected from the group consisting of an aliphatic radical and having 2 or more carbon atoms, a cyclic aliphatic radical, a monocyclic aromatic radical wherein the aromatic rings are linked together directly or by a bridged member.

23. A polyimide composite material comprising from about 15% to about 95% of the polyimide of claim 1 and from about 5% to about 85% of at least one fibrous reinforcing material.

24. The polyimide composite material of claim 23 wherein said fibrous reinforcing material is selected from the group consisting of glass fiber, carbon fiber, aromatic polyimide fiber, metal fiber, alumina fiber and boron fiber.

25. A polyimide composite material comprising from about 15% to about 95% of the polyimide of claim 13 and from about 5% to about 85% of at least one fibrous reinforcing material.

26. The polyimide composite material of claim 25 wherein said fibrous reinforcing material is selected from the group consisting of glass fiber, carbon fiber, aromatic polyimide fiber, metal fiber, alumina fiber and boron fiber.

27. A process for preparing a polyimide comprising reacting (a) at least one aromatic diamine represented by the formula (I)

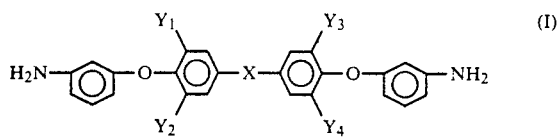

wherein X represents a direct bond or a radical selected from the group consisting of a $C_1$-$C_{10}$ divalent hydrocarbon radical, a hexafluorinated isopropylidene radical, a carbonyl radical, a thio radical and a sulfonyl radical; and $Y_1$, $Y_2$, $Y_3$ and $Y_4$ may be the same or different and represent a radical selected from the group consisting of a hydrogen atom, a lower alkyl radical, a lower alkoxy radical, a chlorine atom and a bromine atom;

(b) at least one tetracarboxylic dianhydride represented by the formula (II)

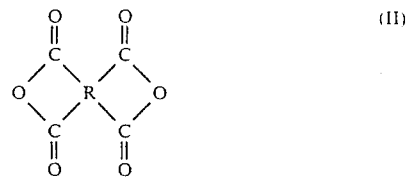

wherein R represents a tetravalent radical selected from the group consisting of an aliphatic radical having at least two carbon atoms, a cyclic aliphatic radical, a monocyclic aromatic radical, a fused polycyclic aromatic radical, a polycyclic aromatic radical wherein the aromatic rings are linked together directly or by a bridged member; and (c) at least one dicarboxylic anhydride represented by the formula (III)

wherein Z represents a divalent radical selected from the group consisting of an aliphatic radical, a cyclic aliphatic radical, a monocyclic aromatic radical, a fused polycyclic aromatic radical and a polycyclic aromatic radical wherein the aromatic rings are linked together directed or via a bridged member.

28. The process of claim 27 wherein the molar ratio of said tetracarboxylic dianhydride to said aromatic diamine is from about 0.9 to about 1.0 mole of tetracarboxylic dianhydride per mole of aromatic diamine.

29. The process of claim 27 wherein the molar ratio of said dicarboxylic anhydride to said aromatic diamine is from about 0.001 to about 1.0 mole of dicarboxylic anhydride per mole of aromatic diamine.

30. The process of claim 29 wherein said molar ratio is from about 0.01 to about 0.5 mole of dicarboxylic anhydride per mole of aromatic diamine.

31. The process of claim 28 wherein the molar ratio of said dicarboxylic anhydride to said aromatic diamine is from about 0.001 to about 1.0 mole of dicarboxylic anhydride per mole of aromatic diamine.

32. The process of claim 27 wherein said aromatic diamine is selected from the group consisting of 4,4'-bis(3-aminophenoxy)biphenyl, 2,2-bis[4-(3-aminophenoxy)phenyl]propane, bis[4-(3-aminophenoxy)phenyl]ketone, bis[4-(3-aminophenoxy)-phenyl]sulfide and bis[4-(3-aminophenoxy)phenyl]-sulfone.

33. The process of claim 27 wherein said tetracarboxylic dianhydride is selected from the group consisting of pyromellitic dianhydride, 3,3',4,4'-benxophenonetetracarboxylic dianhydride, 3,3',4,4'-biphenyltetracarboxylic dianhydride, bis(3,4-dicarboxyphenyl)ether dianhydride and 4,4'-(p-phenylenedioxy)diphthalic dianhydride.

34. The process of claim 27 wherein said dicarboxylic anhydride is selected from the group consisting of glutaric anhydride, citraconic anhydride, tetraconic anhydride, 1,2-cyclobutanedicarboxylic anhydride, 1,2-hexanedicarboxylic anhydride, phthalic anhydride, 3,4-benzophenononedicarboxylic anhydride, 3,4-dicarboxyphenyl phenyl ether anhydride, 3,4-biphenyldicarboxylic anhydride, 3,4-dicarboxyphenyl phenyl sulfide anhydride and 3,4-dicarboxyphenyl phenyl sulfone.

35. The process of claim 27 wherein the reaction temperature is from about 0° C. to about 250° C.

36. The process of claim 35 wherein the reaction temperature is no greater than about 60° C.

37. The process of claim 27 wherein the reaction time is from about 4 hours to about 24 hours.

* * * * *

UNITED STATES PATENT AND TRADEMARK OFFICE
CERTIFICATE OF CORRECTION

PATENT NO. : 5,043,419

DATED : August 27, 1991

INVENTOR(S) : Ohta et al.

It is certified that error appears in the above-identified patent and that said Letters Patent is hereby corrected as shown below:

In column 19, line 32, delete "$Y_1$ a process for";

lines 33-47, delete all lines in their entirety; and line 48, delete "radical and a sulfonyl radical".

In column 20, line 19, amend "directed" to --directly--.

In colum 22, line 1, amend "directed" to --directly--;

line 31, amend "3" to --13--; and line 67, amend "1" to --13--.

In column 23, line 47, amend "polyimide" to --polyamic acid--.

Signed and Sealed this

Sixth Day of April, 1993

Attest:

STEPHEN G. KUNIN

*Attesting Officer*     *Acting Commissioner of Patents and Trademarks*